(12) United States Patent
Lin (10) Patent No.: US 7,944,098 B2
(45) Date of Patent: May 17, 2011

(54) GENERATOR STRUCTURE FOR A BICYCLE HUB

(75) Inventor: Po-Chou Lin, Taichung (TW)

(73) Assignee: Shutter Precision Co., Ltd., Taichung (TW)

( * ) Notice: Subject to any disclaimer, the term of this patent is extended or adjusted under 35 U.S.C. 154(b) by 0 days.

(21) Appl. No.: 12/613,484

(22) Filed: Nov. 5, 2009

(65) Prior Publication Data

US 2010/0123371 A1    May 20, 2010

(30) Foreign Application Priority Data

Nov. 20, 2008  (TW) .............................. 97144972 A (51) Int. Cl.
*H02K 7/18* (2006.01)
(52) U.S. Cl. .................... 310/67 A; 310/75 B; 310/75 C
(58) Field of Classification Search ............... 310/67 A, 310/75 B, 75 C, 257
See application file for complete search history.

(56) References Cited

U.S. PATENT DOCUMENTS

| | | | |
|---|---|---|---|
| 7,199,500 B2* | 4/2007 | Yoshida | 310/257 |
| 7,405,501 B2* | 7/2008 | Peng et al. | 310/67 A |
| 2005/0029900 A1* | 2/2005 | Hiramatsu | 310/268 |
| 2007/0216249 A1* | 9/2007 | Gruendel et al. | 310/156.02 |

* cited by examiner

*Primary Examiner* — Quyen Leung
*Assistant Examiner* — Leda Pham (57) ABSTRACT

A generator structure for a bicycle hub is provided with a generator on an axle in a hub housing. The generator is provided with a magnet group and two opposite yoke iron groups on an outer periphery of a coil unit. The magnet group is formed by arranging plural magnets into an annular shape, and the respective magnets are made of sintered NdFeB and have an N pole at one side thereof and an S pole at the other side thereof. The N poles and the S poles of the magnets are alternately arranged around the magnet group. The outer periphery of each of the yoke iron groups is provided with claws, and the two yoke iron groups are oppositely combined together from both sides of the coil in such a manner that the claws of the yoke iron groups are located on the outer periphery of the coil unit.

10 Claims, 14 Drawing Sheets

GENERATOR STRUCTURE FOR A BICYCLE HUB

BACKGROUND OF THE INVENTION

1. Field of the Invention

The present invention relates to a bicycle hub, and more particularly to a generator structure for a bicycle hub.

2. Description of the Prior Art

Most of the existing bicycle generators are disposed in the hub and generate power by utilizing the rotation of the bicycle wheels to cause the rotation of the rotor of the generator relative to the stator. However, the rotor and the stator for the existing generators are a permanent magnet and a yoke iron, respectively. The permanent magnets are currently all made of anisotropic bonded NdFeB, so that the permanent magnet can be made into a cylinder shape to generate power by cooperating with the yoke iron. The NdFeB-made cylinder-shaped permanent magnet can generate 3-12 MGoe of magnetic energy product by radial magnetization and orientation, and the generated voltage and power are both small. In order to generate relatively large power and voltage, the size of the cylinder-shaped permanent magnet must be increased, and the size of the bicycle hub for placement of the generator is consequently increased, thus increasing the weight of the bicycle while reducing the value of the bicycle.

The present invention has arisen to mitigate and/or obviate the afore-described disadvantages.

SUMMARY OF THE INVENTION

The Technical Problems to be Solved

As for the existing conventional generators for a bicycle hub, the used permanent magnets are made of anisotropic boded NdFeB to form a cylinder shape for cooperating with the yoke irons, however, the magnetic energy product of the cylinder-shaped permanent magnets range from 3 to 12 MGoe, and the generated voltage and power are relatively small, therefore, in order to obtain the required voltage and power, the generator must use much bigger magnets, so the hub must be designed much bigger, thus not only increasing the weight of the bicycle, but reducing the value of the bicycle.

The technical features for solving the above technical problems are described as follows:

The present invention provides a generator structure for a bicycle hub, and the generator structure for a bicycle hub in accordance with the present invention comprises a hub housing, an axle, a generator and a hub cover.

The hub housing is interiorly defined with a receiving groove having an opening opened to one side thereof, and the receiving groove is defined with an axle hole.

The axle is provided with a middle connecting portion, and the axle is disposed in the hub housing and has one end extended out of the axle hole of the hub housing.

The generator is fixedly disposed on the connecting portion of the axle and includes a coil unit, a coil unit, a magnet group, and two yoke iron groups.

The coil unit has an outer periphery on which a coil is winded.

The magnet group is formed by arranging an even number of magnets into an annular shape, the respective magnets are made of sintered NdFeB and have an N pole at one side thereof and an S pole at the other side thereof, the N poles and the S poles of each two neighboring magnets are alternately arranged, that is to say, the N poles and the S poles of the respective magnets located at the same side of the magnet group are alternately arranged the an annular shape, the magnet group is disposed on the outer periphery of the coil unit and combined to an inner periphery of the hub housing in such a manner that the magnet group doesn't rotate with the coil unit but rotates together with the hub housing.

The two yoke iron groups each are formed by arranging plural yoke irons into an annular shape, each of the yoke irons is provided with at least one claw at an outer end thereof, the two yoke iron groups are oppositely combined together from both sides of the coil unit to enclose the coil unit, and the claws extend outwards from the outer periphery of the coil unit and are located opposite the respective magnets.

The hub cover is centrally defined with an axle hole and assembled to the opening of the receiving groove of the hub housing in such a manner that the other end of the axle is extended out of the axle hole of the hub cover, the hub cover fixes the magnet group on the hub housing located at the outer periphery of the coil unit.

The present invention has the following advantages:

The magnet group of the generator structure for a bicycle hub is made of sintered NdFeB, and the magnetic energy product of the sintered NdFeB magnets can achieve 35-53 MGoe, the magnet group of the present invention is formed by arranging even number of magnets in an annular shape, and each of the magnets has an N pole at one side thereof and an S pole at the other side thereof, the N poles and the S poles are alternately arranged at both sides of the magnet group to cooperate with the two opposite yoke iron groups, so that the generator can be disposed in the hub housing, having the minimum size, thus reducing the volume and the weight of the hub housing while increasing the voltage and the power that are generated by the generator.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
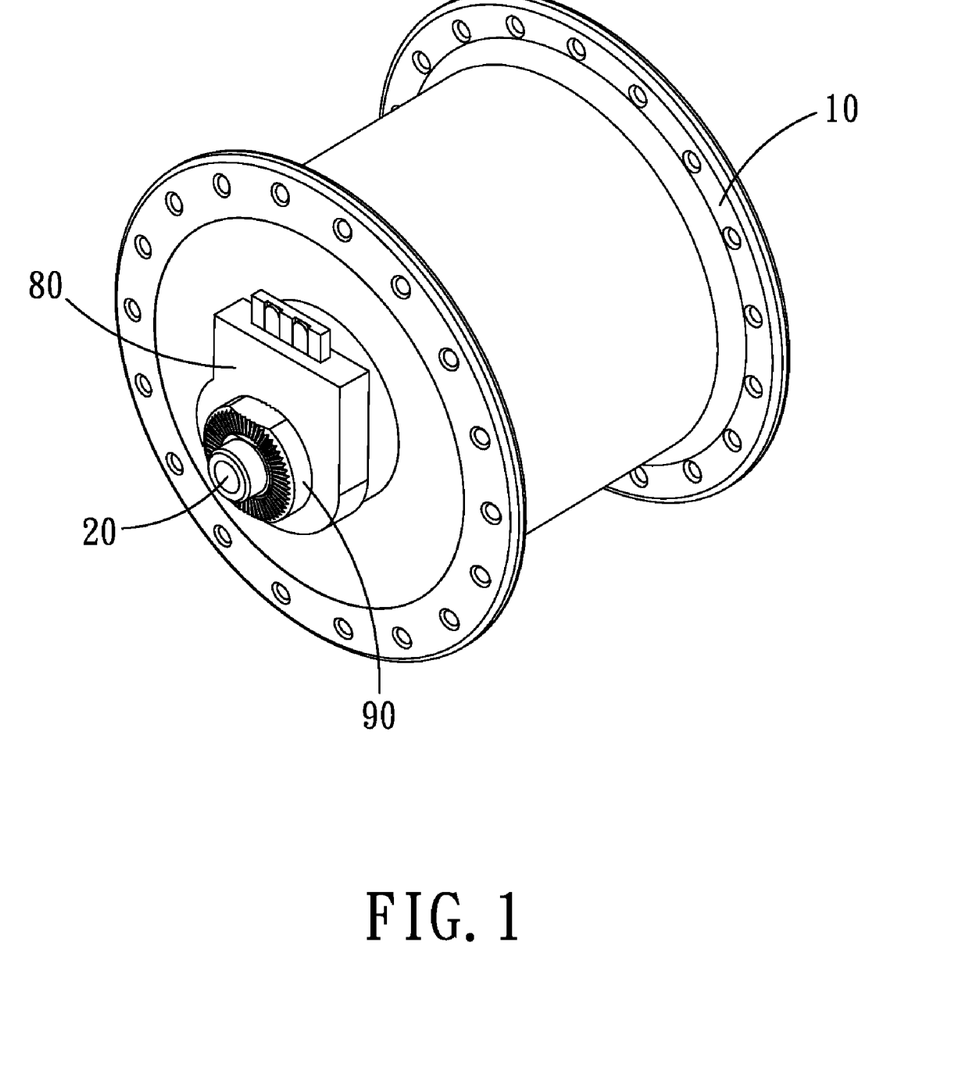
FIG. 1 is a perspective view of a generator structure for a bicycle hub in accordance with the present invention.
Figure 2:
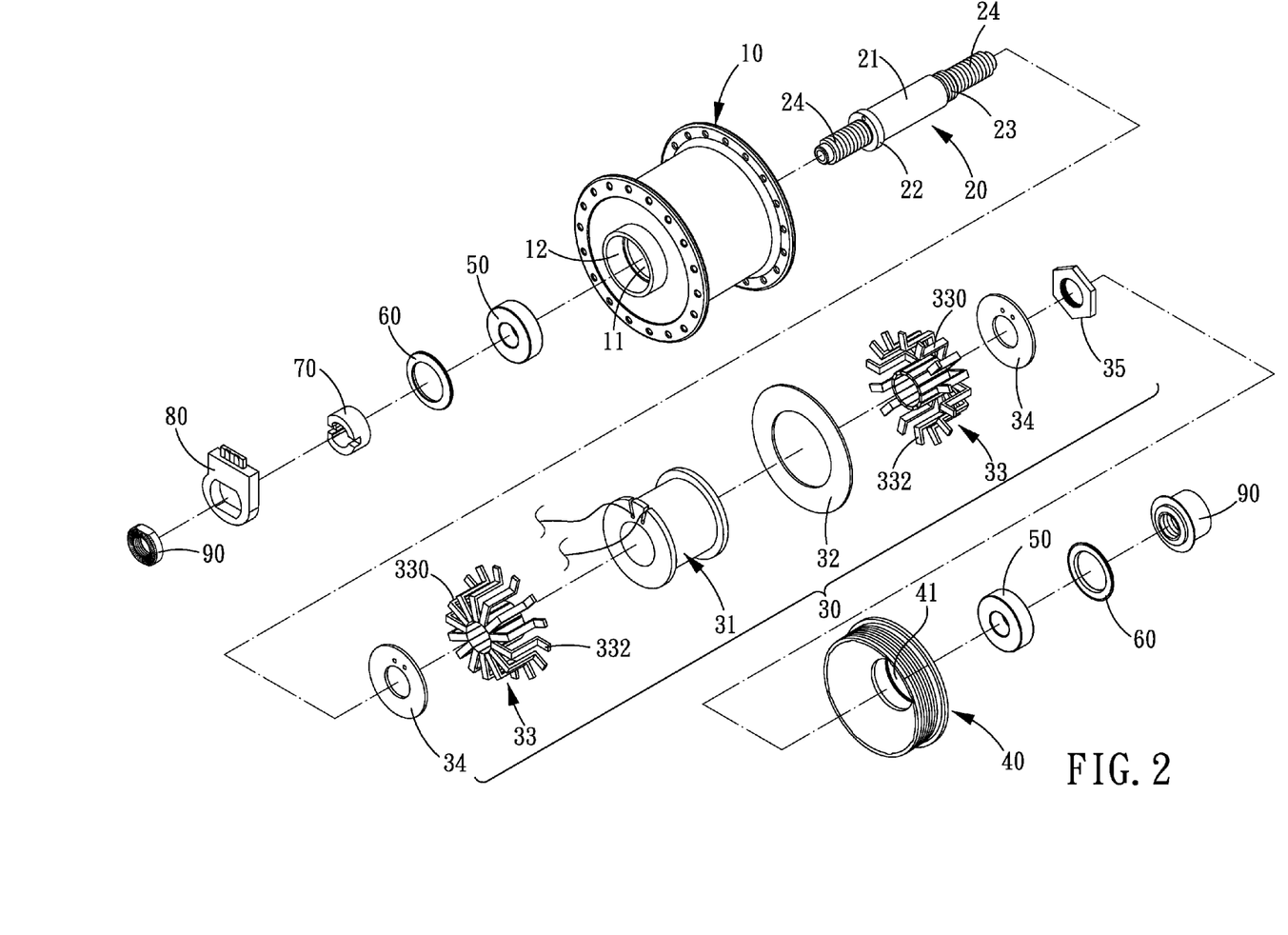
FIG. 2 is an exploded view of the generator structure for a bicycle hub in accordance with the present invention.
Figure 3:
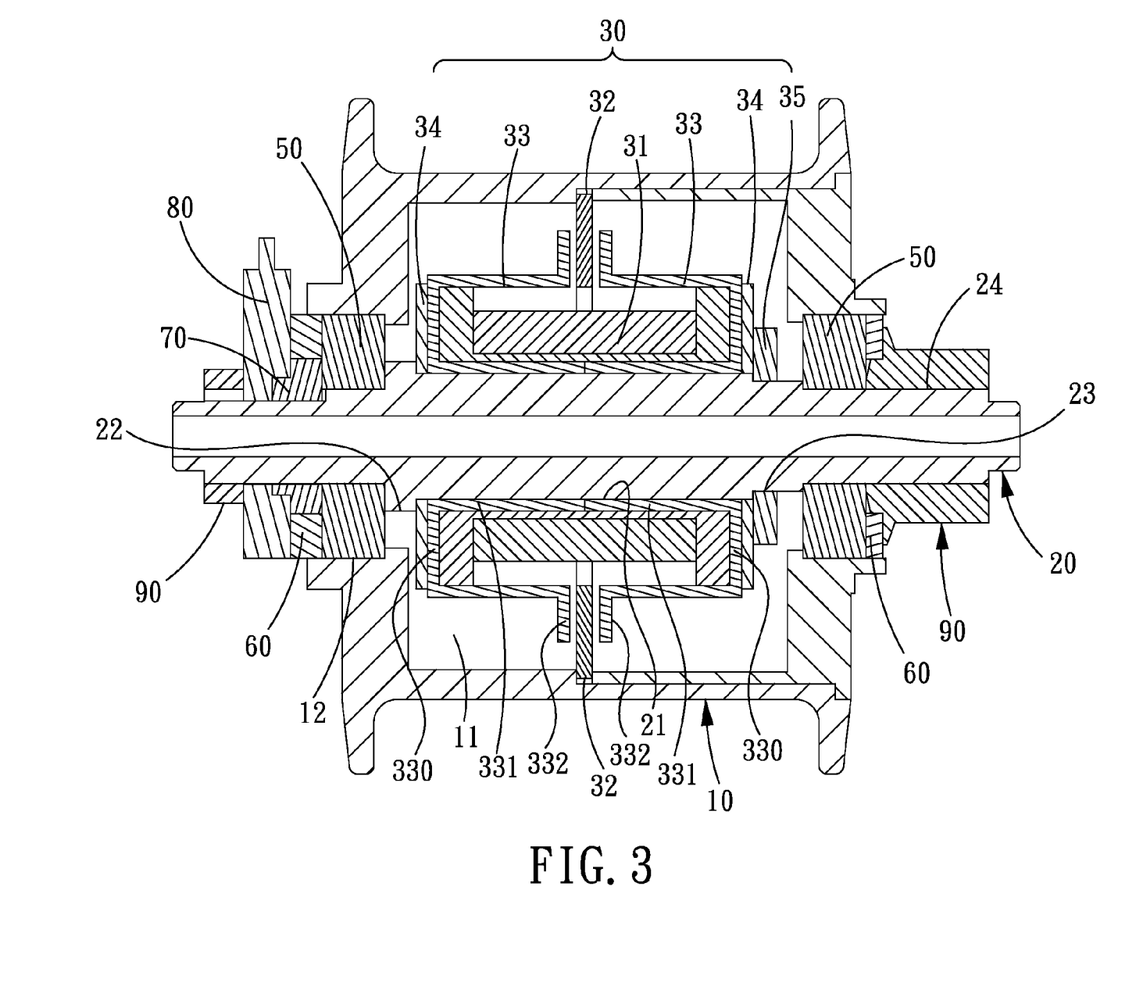
FIG. 3 is a cross-sectional view of the generator structure for a bicycle hub in accordance with the present invention.

Referring to FIGS. 1-3, a generator structure for a bicycle hub in accordance with the present invention comprises a hub housing 10, an axle 20, a generator 30, a hub cover 40, two bearings 50, two waterproof rubber rings 60, an inner plug 70, a connector 80, and two axle nuts 90.

The hub housing 10 is interiorly defined with a receiving groove 11 having an opening opened toward one side thereof, and the receiving groove 11 is defined with an axle hole 12.

The axle 20 is provided with a middle connecting portion 21, a protruding flange 22 at one side of the connecting portion 21, and a stator assembling portion 23 at the other side of the connecting portion 21. The axle 21 is further provided with a nut assembling portion 24 at each of two opposite ends thereof. The axle 20 is disposed in the hub housing 10 and has one end extended out of the axle hole 12.

Figure 4:
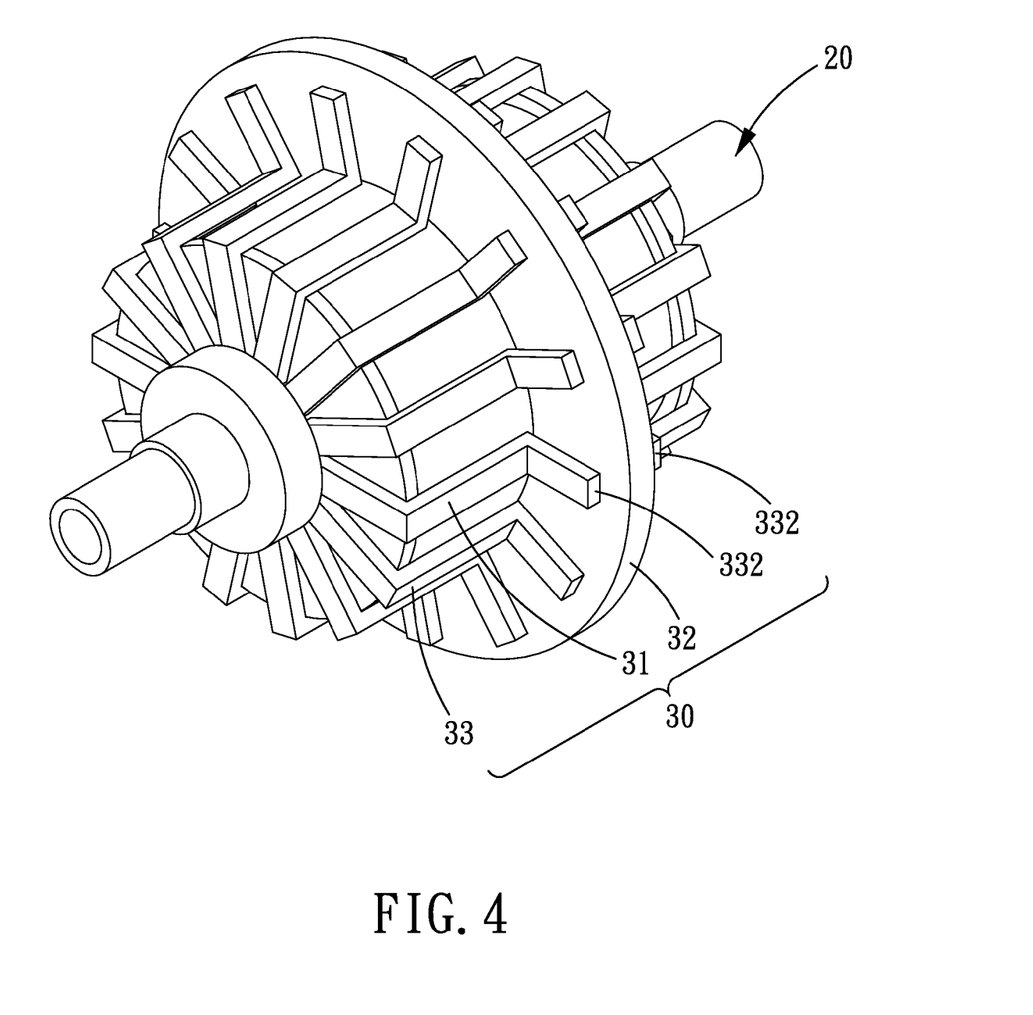
FIG. 4 is a perspective view of a generator for the generator structure for a bicycle hub in accordance with a first embodiment of the present invention.
Figure 5:
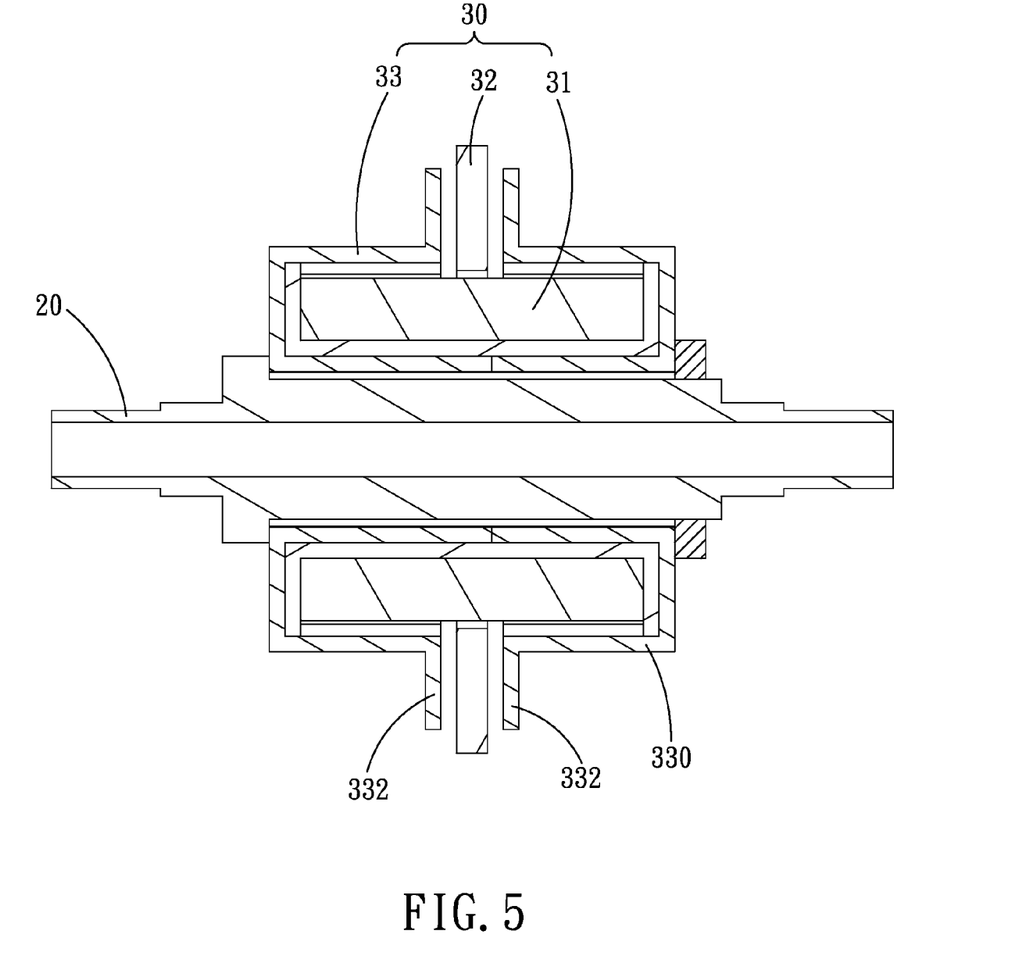
FIG. 5 is a cross-sectional view of the generator for the generator structure for a bicycle hub in accordance with the first embodiment of the present invention.
Figure 6:
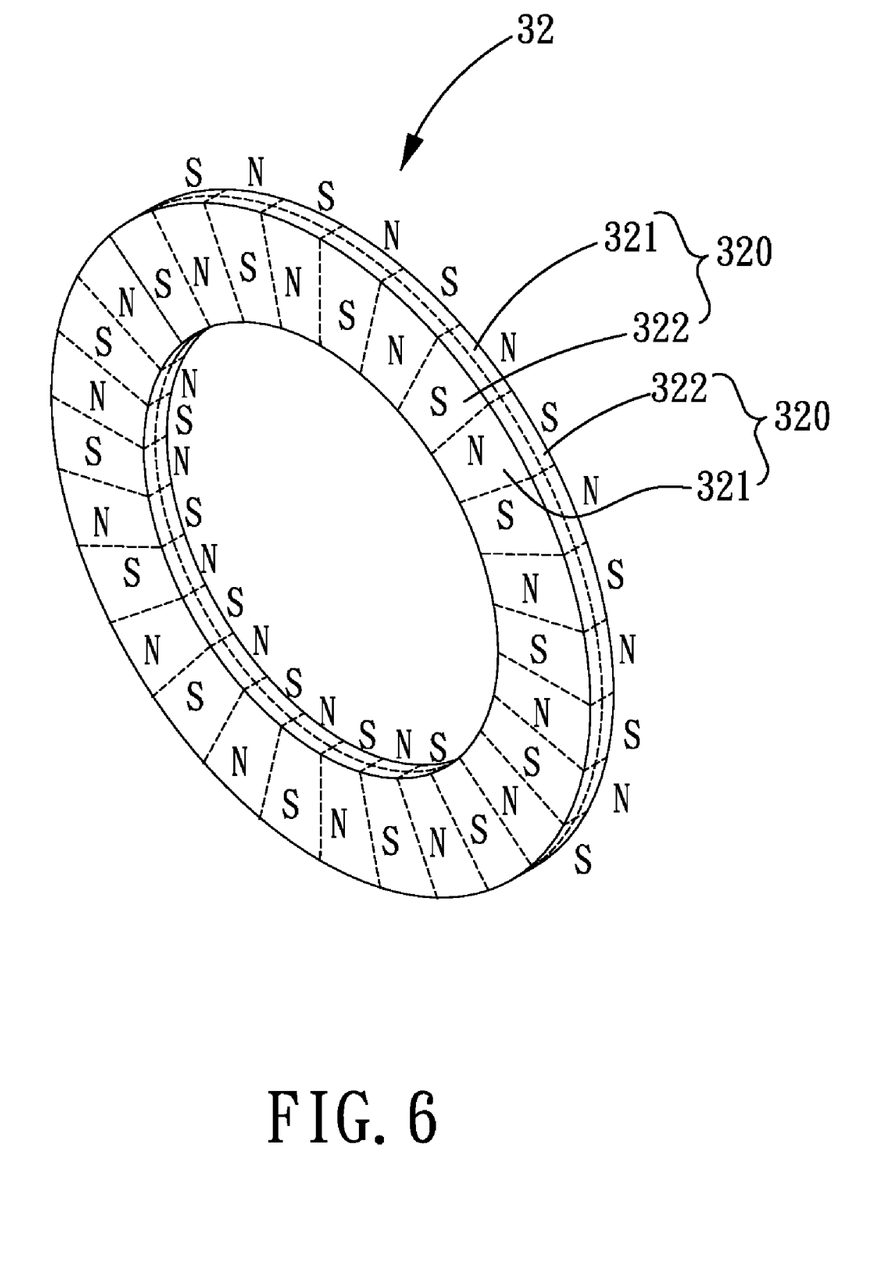
FIG. 6 is a perspective view of a magnet group in accordance with a first embodiment of the present invention.

The generator 30 is fixedly disposed on the connecting portion 21 of the axle 20. Referring to FIGS. 4-6, the generator 30 includes a coil unit 31, a magnet group 32, two yoke iron groups 33, two generator pressing plates 34, and a stator nut 35.

The coil unit 31 has an outer periphery around which a coil is winded.

The magnet group 32 is formed by arranging an even number of magnets 320 into an annular shape. The respective magnets 320 are made of sintered NdFeB and have an N pole 321 at one side thereof and an S pole 322 at the other side thereof. The N poles 321 and the S poles 322 of each two neighboring magnets 320 are alternately arranged, that is to say, the N poles 321 and the S poles 322 of the respective magnets 320 located at the same side of the magnet group 32 are alternately arranged into an annular shape. The magnet group 32 is disposed on the outer periphery of the coil unit 31 and combined to an inner periphery of the hub housing 10 in such a manner that the magnet group 32 doesn't rotate with the coil unit 31 but rotates together with the hub housing 10.

The two yoke iron groups 33 each are formed by arranging plural yoke irons 330 into an annular shape. In the present embodiment, the number of yoke irons 330 of each of the yoke iron groups 33 is the same as the number of the magnets 320 of the magnet group 32. Each of the yoke irons 330 is provided with a claw 332 at an outer end thereof. The two yoke iron groups 33 are oppositely combined together from both sides of the coil unit 31 to enclose the coil unit 31, and the claws 332 extend outwards from the outer periphery of the coil unit 31 and are located opposite the respective magnets 320.

The two generator pressing plates 34 are exteriorly pressed against the respective yoke iron groups 33.

The coil unit 31 and the two yoke iron groups 33 of the generator 30 are disposed on the connecting portion 21 of the axle 20 in such a manner that one of the two yoke iron groups 33 is positioned against the flange 22, and the other of the two yoke iron groups 33 is fixed by the stator nut 35 which is screwed onto the stator assembling portion 23.

The hub cover 40 is centrally defined with an axle hole 41 and assembled to the opening of the receiving groove 11 of the hub housing 10 in such a manner that the other end of the axle 20 is extended out of the axle hole 41, so that the hub cover 40 can fix the magnet group 32 on the hub housing 10 located at the outer periphery of the coil unit 31.

The two bearings 50 are disposed in the axle holes 12, 41 of the hub housing 10 and the hub cover 40, respectively for insertion of the axle 20.

The two waterproof rubber rings 60 are disposed at outer sides of the axle holes 12, 41 of the hub housing 10 and the hub cover 40, respectively.

The inner plug 70 is disposed at an outer side of one of the bearings 50.

The connector 80 is disposed at an outer side of the inner plug 70 and electrically connected to both poles of the coil on the coil unit 31 of the generator 30.

The two axle nuts 90 are screwed on the nut assembling portions 24 at both ends of the axle 20 for fixing the axle 20.

When the bicycle moves forward, the wheels and the hub housing 10 will rotate synchronously, and the magnet group 32 of the generator 30 will be driven to rotate between the two opposite yoke iron groups 33 which are fixedly combined to the axle 20 and can not rotate, so that the coil unit 31 can produce electric motive force to generate power.

The magnet group 32 can have many forms as described follows without changing its basic structure that the N poles and the S poles located at the same side of the magnet group are alternately arranged into the annular shape:

Referring to FIG. 6 first, the magnets 320 of the magnet group 32 are integrally formed into an annular shape, the N poles 321 and the S poles 322 of the respective magnets 32 are located at a left side and a right side of the annular magnet group 32.

Figure 7:
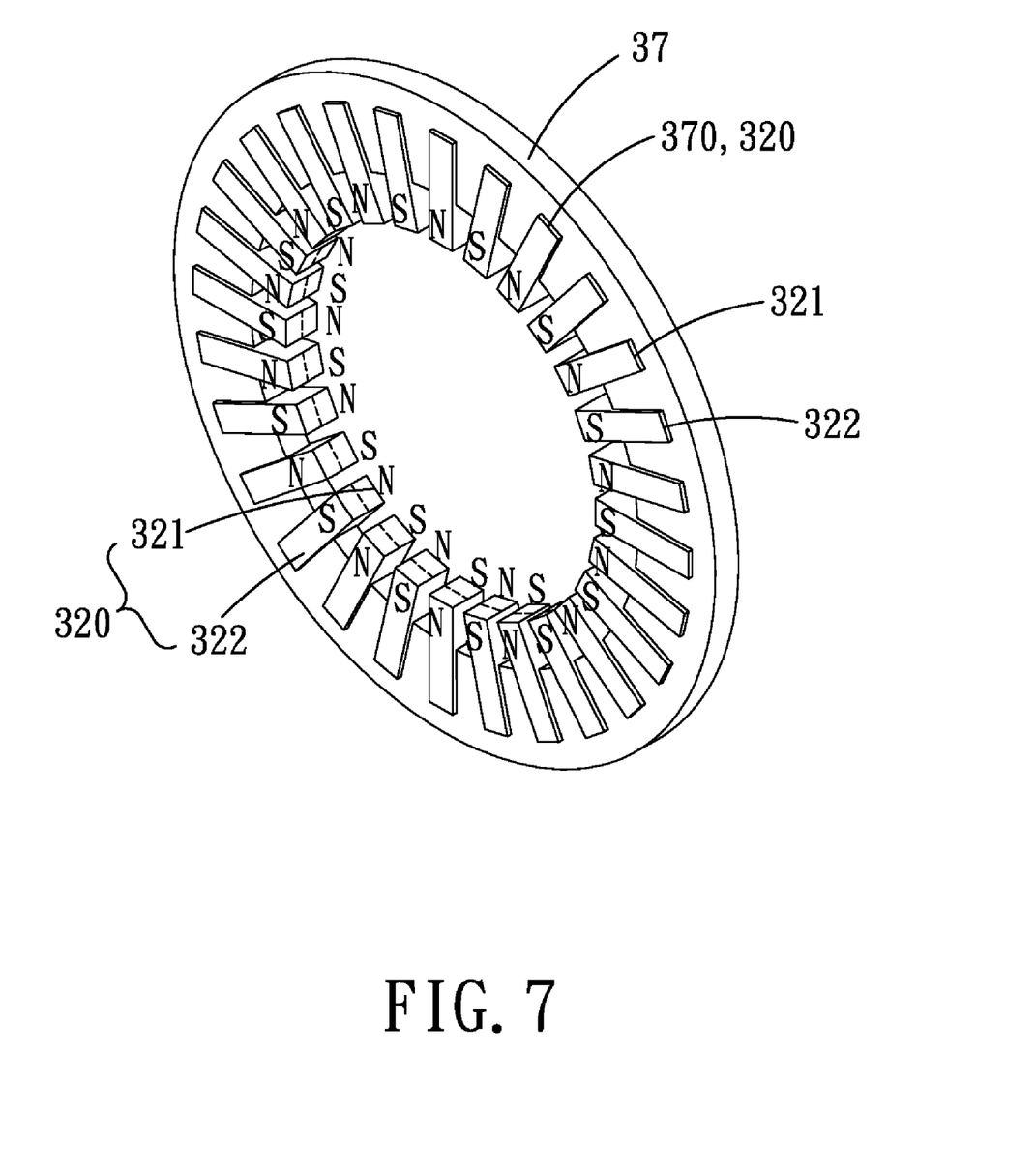
FIG. 7 is a perspective view of a magnet group in accordance with a second embodiment of the present invention.

Further referring to FIG. 7, the magnets 320 of the magnet group 32 are independently formed and then together fixed by a magnet ring 37 to form an annular shape. The magnet ring 37 is equidistantly defined with plural magnet grooves 370 around an inner periphery thereof for placement of the magnets 320. The N poles 321 and the S poles 322 of the respective magnets 32 are located at a left side and a right side of the magnet ring 37.

Figure 8:
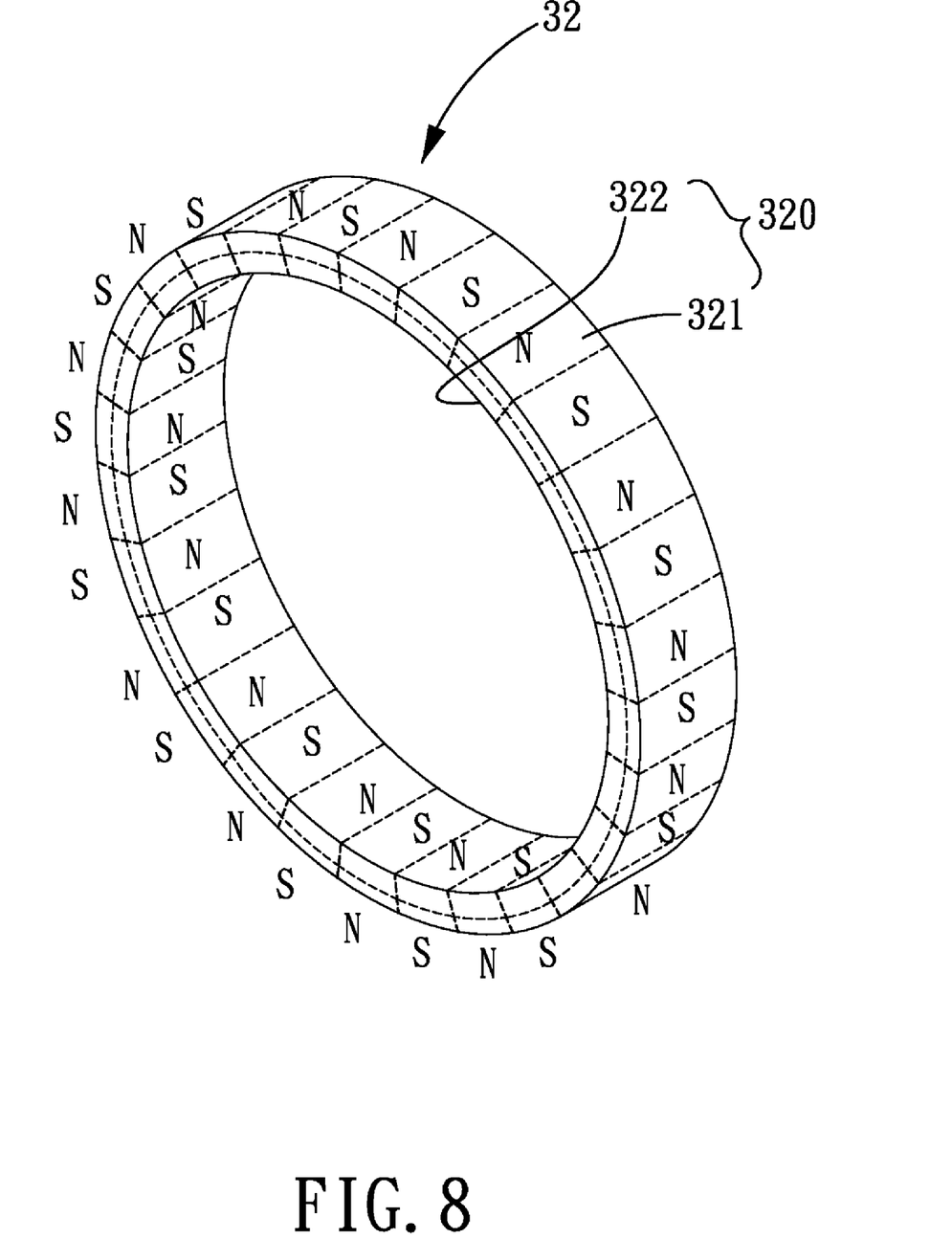
FIG. 8 is a perspective view of a magnet group in accordance with a third embodiment of the present invention.

Finally referring to FIG. 8, the magnets 320 of the magnet group 32 are integrally formed into an annular shape, and the N poles 321 and the S poles 322 of the respective magnet group 32 are located at an outer peripheral side and an inner peripheral side of the magnet group 32.

The generator 30 also has many forms without changing the above basic structure:

Referring to FIGS. 4 and 5 first, the magnet group 32 is disposed on the middle portion of the coil unit 31, the number of the yoke irons 330 of each of the two yoke iron groups 33 is a half of the number of the magnets 320, and the yoke irons 330 of the two yoke groups 33 are symmetrically arranged and oppositely combined together to enclose the coil unit 31. One end of the each of the yoke irons 330 is provided with the claw 332, and the claws 332 of the two yoke iron groups 33 are oppositely arranged at the left and right sides of the respective magnets 320 and located opposite the N pole 321 and the S pole 322 of the respective magnets 320. The magnet group 32 has an outer periphery fixed to a middle portion of a periphery of the receiving groove 11 of the hub housing 10.

Figure 9:
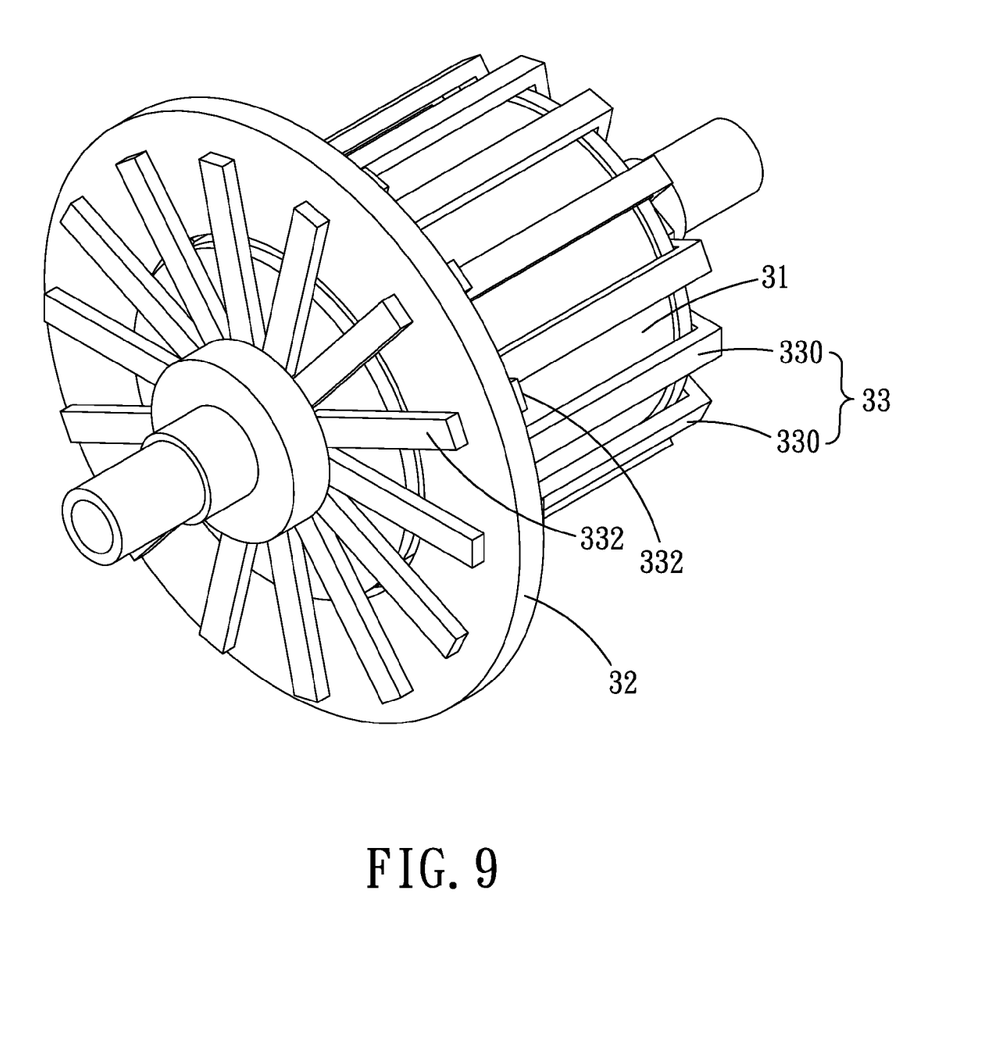
FIG. 9 is a perspective view of a generator in accordance with a second embodiment of the present invention.
Figure 10:
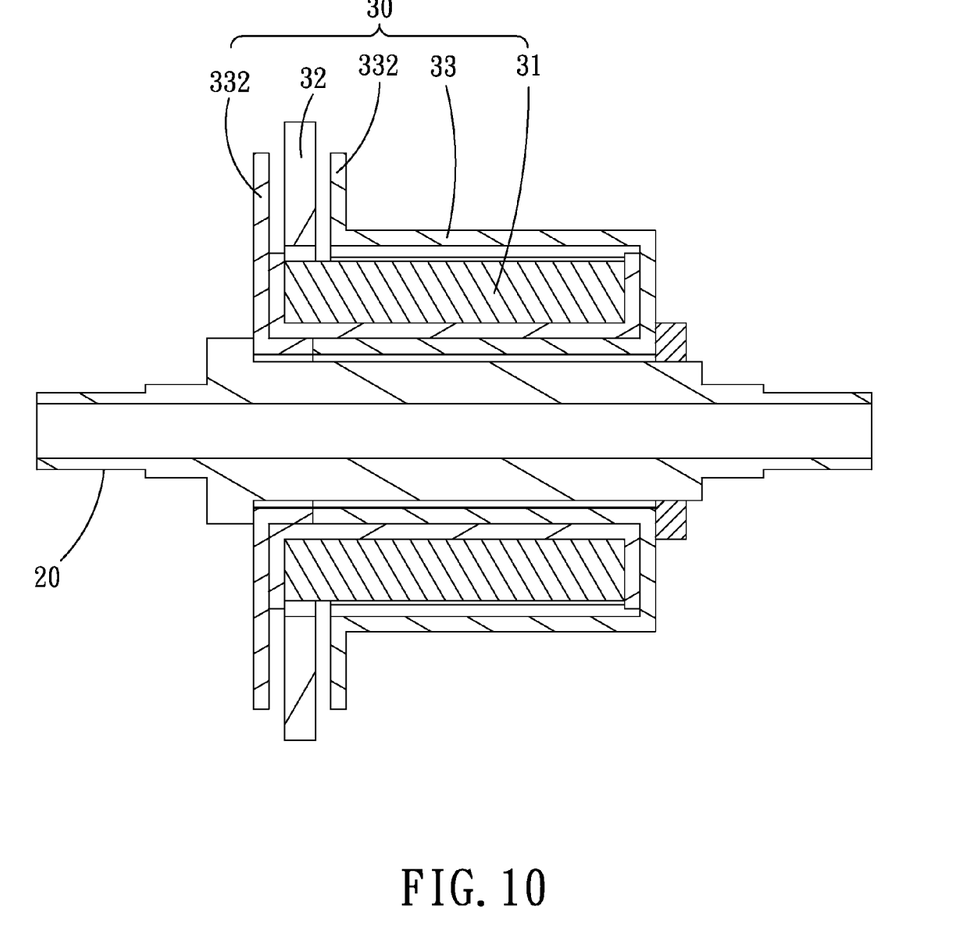
FIG. 10 is a cross-sectional view of the generator in accordance with the second embodiment of the present invention.

Further referring to FIGS. 9 and 10, the magnet group 32 is disposed at one side of the outer periphery of the coil unit 31, and the number of the yoke irons 330 of each of the two yoke iron groups 33 is a half of the number of the magnets 320. One of the yoke iron groups 33 is shorter than the other of the yoke iron groups 33. The two yoke iron groups 33 are oppositely combined together to enclose the coil unit 31. One end of each of the yoke irons 330 is provided with a claw 332, and the claws 332 of the two yoke iron groups 33 are oppositely arranged at a left side and a right side of the respective magnets 320 while being located opposite the N pole 321 and the S pole 322 of the respective magnets 320. The magnet group 32 has an outer periphery fixed to one side of the periphery of the receiving groove 11 of the hub housing 10.

Figure 11:
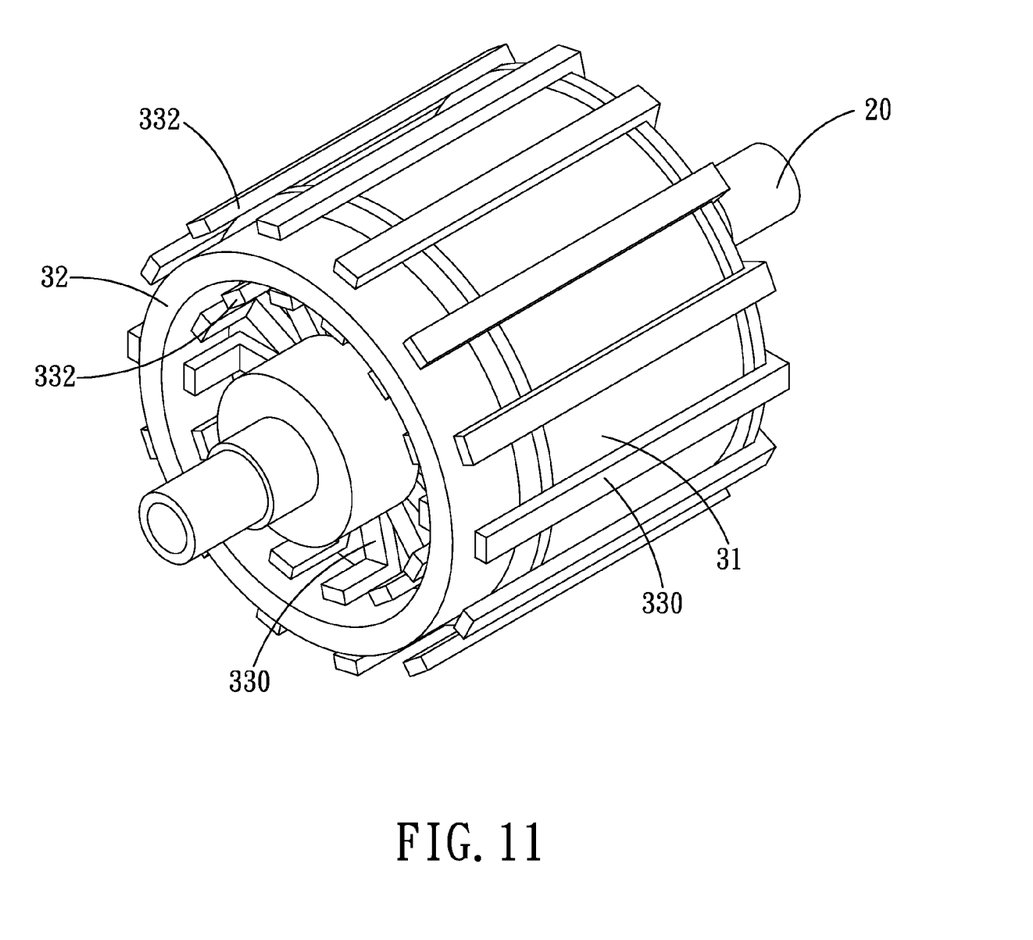
FIG. 11 is a perspective view of a generator in accordance with a third embodiment of the present invention.
Figure 12:
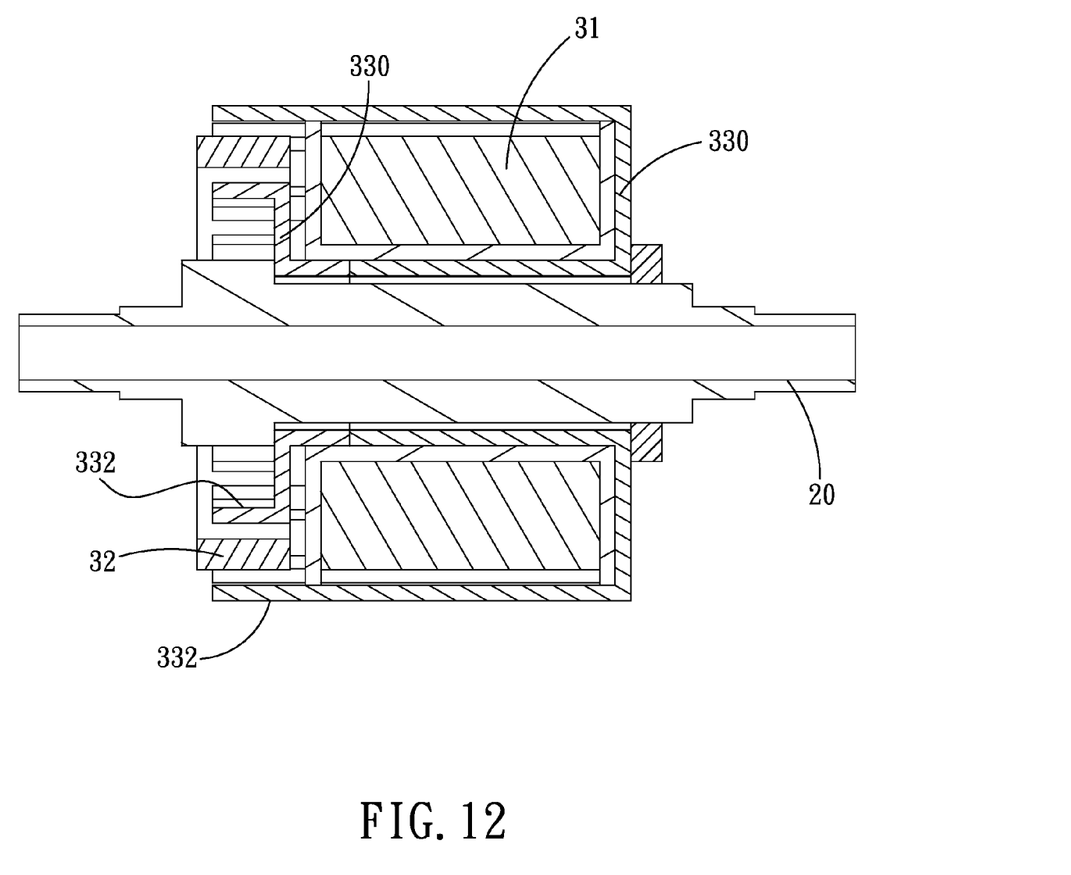
FIG. 12 is a cross-sectional view of the generator in accordance with the third embodiment of the present invention.

Referring to FIGS. 8, 11 and 12, the magnet group 32 is disposed at one side of the coil unit 31, the number of the yoke irons 330 of each of the two yoke iron groups 33 is a half of the number of the magnets 320, and one of the yoke iron groups 33 is shorter than the other of the yoke iron groups 33. The two yoke iron groups 33 are oppositely combined together to enclose the coil unit 31, and one end of each of the yoke irons 330 is provided with a claw 332. The claws 332 of the two yoke iron groups 33 are oppositely arranged at an outer peripheral side and an inner peripheral side of the magnet group 32 while being located opposite to the N pole 321 and the S pole 322 of the respective magnets 320. The magnet group 32 has one side fixed at a bottom of the receiving groove 11 of the hub housing 10 or fixed to an end surface of the hub cover 40.

Figure 13:
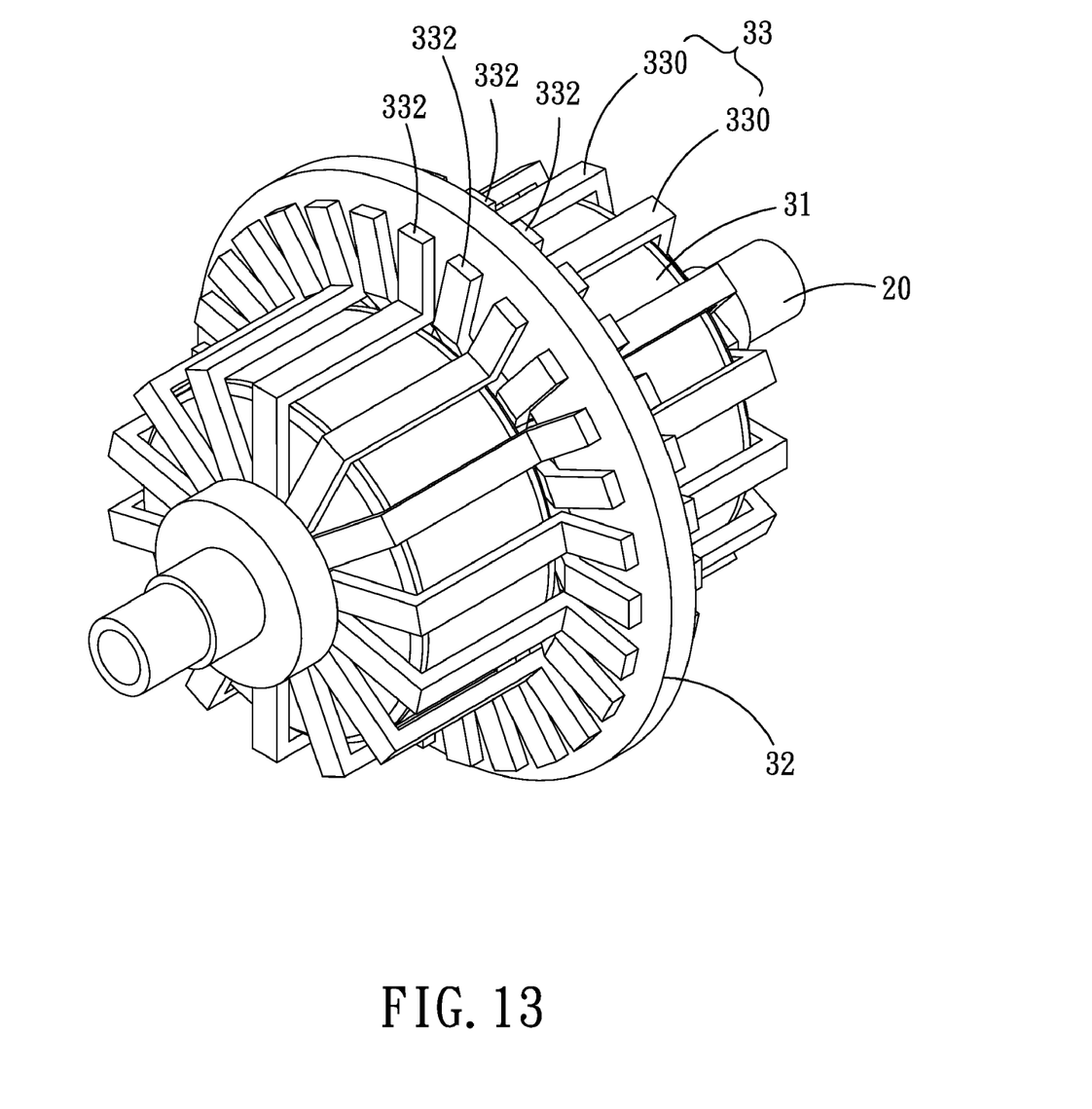
FIG. 13 is a perspective view of a generator in accordance with a fourth embodiment of the present invention.
Figure 14:
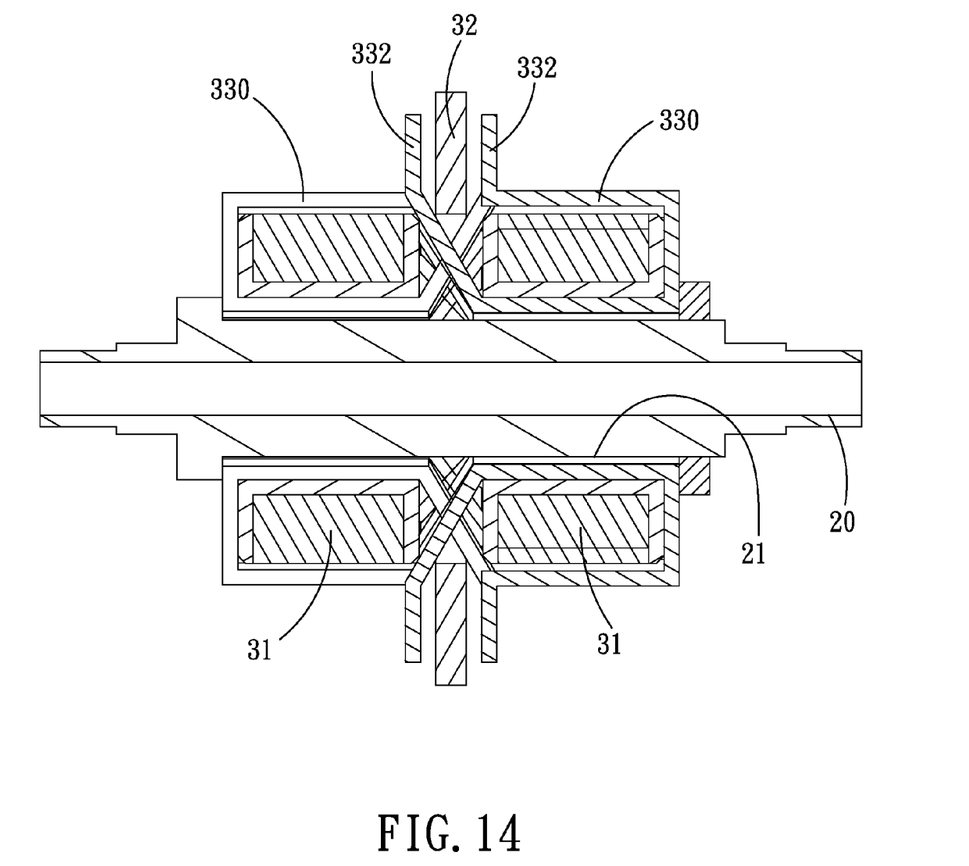
FIG. 14 is a cross-sectional view of the generator in accordance with the fourth embodiment of the present invention.

Finally referring to FIGS. 13 and 14, the magnet group 32 is disposed at one side of the outer periphery of the coil unit 31, and the number of the yoke irons 330 of each of the two yoke iron groups 33 is a half of the number of the magnets 320. One of the yoke iron groups 33 is shorter than the other of the yoke iron groups 33, and the two yoke iron groups 33 are oppositely combined together to enclose the coil unit 31. One end of each of the yoke irons 330 is provided with two claws 332 at a left site and a right side of the respective magnets 320, and the claws 332 of the two yoke iron groups 33 are alternately arranged. The magnet group 32 has the outer periphery fixed to the periphery of the receiving groove 11 of the hub housing 10.

With the above structure, the present invention has the following advantages: the magnets 320 of the magnet group 32 of the present invention are made of sintered NdFeB, and the magnetic energy product of the sintered NdFeB magnets 320 can reach 35-53 MGoe, the magnet group 32 of the present invention is formed by arranging a even number of magnets 320 in an annular shape, and each of the magnets 320 has an N pole 321 at one side thereof and an S pole 322 at the other side thereof, the N poles 321 and the S poles 322 of the respective magnets 320 located at the same side of the magnet group 32 are alternately arranged into the annular shape, so that the magnet group 32 cooperating with the two opposite yoke iron groups 33 can be disposed in the hub housing 10, having the minimum size, thus reducing the volume and the weight of the hub housing 10 while increasing the voltage and the power that are generated by the generator 30.

While we have shown and described various embodiments in accordance with the present invention, it should be clear to those skilled in the art that further embodiments may be made without departing from the scope of the present invention.

What is claimed is:

1. A generator structure for a bicycle hub comprising:
   a hub housing being interiorly defined with a receiving groove having an opening opened to one side thereof, the receiving groove being defined with an axle hole;
   an axle being provided with a middle connecting portion, and the axle being disposed in the hub housing and having one end extended out of the axle hole of the hub housing;
   a generator being fixedly disposed on the connecting portion of the axle and including:
      a coil unit having an outer periphery on which a coil is winded;
      a magnet group being formed by arranging an even number of magnets into an annular shape, the respective magnets being made of sintered NdFeB and having an N pole at one side thereof and an S pole at the other side thereof, the N poles and the S poles of each two neighboring magnets being alternately arranged, that is to say, the N poles and the S poles of the respective magnets located at the same side of the magnet group are alternately arranged into the annular shape, the magnet group being disposed on the outer periphery of the coil unit and combined to an inner periphery of the hub housing in such a manner that the magnet group doesn't rotate with the coil unit but rotates together with the hub housing; and
      two yoke iron groups each being formed by arranging plural yoke irons into an annular shape, each of the yoke irons being provided with at least one claw at an outer end thereof, the two yoke iron groups being oppositely combined together from both sides of the coil unit to enclose the coil unit, and the claws extending outwards from the outer periphery of the coil unit and being located opposite the respective magnets; and
   a hub cover being centrally defined with an axle hole and assembled to the opening of the receiving groove of the hub housing in such a manner that the other end of the axle being extended out of the axle hole of the hub cover, the hub cover fixing the magnet group on the hub housing located at the outer periphery of the coil unit;
   wherein the generator further includes two generator pressing plates and a stator nut, the axle is further provided with a protruding flange at one side of the connecting portion and a stator assembling portion at the other side of the connecting portion, the generator pressing plates are exteriorly pressed against the respective yoke iron groups, the coil unit of the generator and the two yoke iron groups are disposed on the connecting portion of the axle in such a manner that one of the two yoke iron groups is positioned against the flange, and the other of the two yoke iron groups is fixed by the stator nut which is screwed onto the stator assembling portion.

2. The generator structure for a bicycle hub as claimed in claim 1, wherein the axle is further provided with a nut assembling portion at each of two opposite ends thereof, and the generator structure further comprises:
   two bearings are disposed in the axle holes of the hub housing and the hub cover, respectively for insertion of the axle;
   two waterproof rubber rings are disposed at outer sides of the axle holes of the hub housing and the hub cover, respectively;
   an inner plug is disposed at an outer side of one of the bearings;
   a connector is disposed at an outer side of the inner plug and electrically connected to the coil of the coil unit of the generator; and
   two axle nuts are screwed on the nut assembling portions at both ends of the axle for fixing the axle.

3. The generator structure for a bicycle hub as claimed in claim 1, wherein the magnets of the magnet group are integrally formed into the annular shape, the N poles and the S poles of the respective magnets are located at a left side and a right side of the annular magnet group.

4. The generator structure for a bicycle hub as claimed in claim 1, wherein the magnets of the magnet group are independently formed and then together fixed by a magnet ring to form the annular shape, the magnet ring is equidistantly defined with plural magnet grooves around an inner periphery thereof for placement of the magnets, the N poles and the S poles of the respective magnets are located at a left side and a right side of the magnet ring.

5. The generator structure for a bicycle hub as claimed in claim 1, wherein the magnets of the magnet groups are integrally formed into the annular shape and the N poles and the S poles of the respective magnets are located at an outer peripheral side and an inner peripheral side of the magnet group.

6. The generator structure for a bicycle hub as claimed in claim 1, wherein the number of the yoke irons of each of the yoke iron groups is the same as the number of the magnets of the magnet groups.

7. The generator structure for a bicycle hub as claimed in claim 1, wherein the magnet group is disposed on a middle portion of the coil unit, the number of the yoke irons of each of the two yoke iron groups is a half of the number of the magnets of the magnet group, and the yoke irons of the two yoke groups are symmetrically arranged and oppositely combined together to enclose the coil unit, one end of each of the yoke irons is provided with one claw, and the claws of the two yoke iron groups are oppositely arranged at a left side and a right side of the respective magnets and located opposite the N pole and the S pole of the respective magnets, the magnet group has an outer periphery fixed to a middle portion of a periphery of the receiving groove of the hub housing.

8. The generator structure for a bicycle hub as claimed in claim 1, wherein the magnet group is disposed at one side of the outer periphery of the coil unit, and the number of the yoke irons of each of the two yoke iron groups is a half of the number of the magnets of the magnet group, one of the yoke iron groups is shorter than the other of the yoke iron groups, and the two yoke iron groups are oppositely combined together to enclose the coil unit, one end of each of the yoke irons is provided with one claw, and the claws of the two yoke iron groups are oppositely arranged at a left side and a right side of the respective magnets while being located opposite the N pole and the S pole of the respective magnets, the magnet group has an outer periphery fixed to one side of a periphery of the receiving groove of the hub housing.

9. The generator structure for a bicycle hub as claimed in claim 1, wherein the magnet group is disposed at one side of the coil unit, the number of the yoke irons of each of the two yoke iron groups is a half of the number of the magnets of the magnet group, and one of the yoke iron groups is shorter than the other of the yoke iron groups, the two yoke iron groups are oppositely combined together to enclose the coil unit, and one end of each of the yoke irons is provided with one claw, the claws of the two yoke iron groups are oppositely arranged at an outer peripheral side and an inner peripheral side of the magnet group while being located opposite the N pole and the S pole of the respective magnets, the magnet group has one side fixed at a bottom of the receiving groove of the hub housing or fixed to an end surface of the hub cover.

10. The generator structure for a bicycle hub as claimed in claim 1, wherein the magnet group is disposed at one side of the outer periphery of the coil unit, and the number of the yoke irons of each of the two yoke iron groups is a half of the number of the magnets of the magnet groups, one of the yoke iron groups is shorter than the other of the yoke iron groups, and the two yoke iron groups are oppositely combined together to enclose the coil unit, one end of each of the yoke irons is provided with two opposite claws at a left site and a right side of the respective magnets, and the claws of the two yoke iron groups are alternately arranged, the magnet group has an outer periphery fixed to a periphery of the receiving groove of the hub housing.

* * * * *